US006188064B1

(12) United States Patent
Köster

(10) Patent No.: US 6,188,064 B1
(45) Date of Patent: Feb. 13, 2001

(54) MASS SPECTROMETRY METHOD FOR ACCURATE MASS DETERMINATION OF UNKNOWN IONS

(75) Inventor: Claus Köster, Lilienthal (DE)

(73) Assignee: Bruker Daltonik GmbH (DE)

( * ) Notice: Under 35 U.S.C. 154(b), the term of this patent shall be extended for 0 days.

(21) Appl. No.: 09/238,760

(22) Filed: Jan. 28, 1999

(30) Foreign Application Priority Data

Jan. 29, 1998 (DE) .............................................. 198 03 309

(51) Int. Cl.[7] ............................ H01J 49/00; B01D 59/44
(52) U.S. Cl. ............................................ 250/282; 250/281
(58) Field of Search .................................... 250/282, 281, 250/424

(56) References Cited

U.S. PATENT DOCUMENTS 5,247,175 9/1993 Schoen et al. ........................ 250/281
6,104,027 * 8/2000 Gee et al. ............................ 250/282

FOREIGN PATENT DOCUMENTS

WO 97/25736 7/1997 (WO) .

* cited by examiner

*Primary Examiner*—Bruce C. Anderson
*Assistant Examiner*—Nikita Wells

(57) ABSTRACT

The invention relates to accurate determination of the position coordinate that is the location, frequency or time coordinate of an ion peak in a mass spectrum, as the basis for an accurate mass determination of the ions.

The invention consists of fitting a suitable function, e.g. a superposition of bell-shaped curves, to all peaks of a peak group simultaneously instead of using one isolated mass peak only, and applying a suitable abundance distribution for all the peaks of the measured group, e.g. of an isotopic pattern. The true mass distances between the individual peaks of the peak group and the ratio of their widths are usually known. The distances between the peaks of an isotopic pattern can, for instance, be derived in a good approximation from mean compositions of the substances of a chemical class. During curve fitting by a mathematical optimization process, in the simplest case only the position coordinate and the width of the bell-shaped curves are varied. If the pattern used is an isotopic pattern, a precise position determination of the monoisotopic ions of the isotope group is obtained automatically, even if the monoisotopic peak is not visible at all. For organic substances, in the simplest case only the pattern of the carbon isotopes in that chemical class are used for pattern fitting.

14 Claims, 1 Drawing Sheet

MASS SPECTROMETRY METHOD FOR ACCURATE MASS DETERMINATION OF UNKNOWN IONS

The invention relates to accurate determinations of the position coordinate, i.e. the location, frequency, or time coordinate of an ion peak in a mass spectrum, as the basis for an accurate mass determination of the ions.

The invention consists of fitting a suitable function, e.g. a superposition of bell-shaped curves, to all peaks of a peak group simultaneously instead of using one isolated mass peak only, and applying a suitable abundance distribution for all the peaks of the measured group, e.g. of an isotopic pattern. The true mass distances between the individual peaks of the peak group and the ratio of their widths are known with high accuracy. The distances between the peaks of an isotopic pattern can, for instance, be derived in a good approximation from mean compositions of the substances of a chemical class. During curve fitting by a mathematical optimization process, in the simplest case only the position coordinate and the width of the bell-shaped curves are varied. If the pattern used is an isotopic pattern, a precise position determination of the monoisotopic ions of the isotope group is obtained automatically, even if the monoisotopic peak is not visible at all. For organic substances, in the simplest case only the pattern of the carbon isotopes in that chemical class are used for pattern fitting.

STATE OF THE ART

For accurate mass determination of ions of an unknown substance using a mass spectrometer, the mass spectrometer always first has to be calibrated with a known calibration substance, preferably at several points on the mass spectrum. By this calibration procedure a function called a "calibration curve" is obtained between the position of an ion peak in the mass spectrum and the mass of the ions of that ion peak. Then a spectrum of an unknown substance can be measured and the mass of an unknown ion can be calculated using this the calibration curve. For more accurate measurements one adds to the unknown substance one or two known reference substances and corrects the masses of the unknown substance using the mass differences, which one has found for the reference substances between calculated and true masses (method with "internal reference").

The basis of all these calibration and measurement methods is always a calculation of a location, frequency, or time coordinate for an individual ion mass peak in the mass spectrum, which consists in total of a large number of individual digital measurement values. Location coordinates are obtained in spectra of static mass spectrometers with spatial resolution using photographic plates or diode arrays, frequency values in Fourier transform mass spectrometers, time values in time-scan mass spectrometers and in time-of-flight mass spectrometers. In doing so one must derive the accurate location, frequency, or time value from a measured (local or temporal) profile of the measured values across a mass peak. In the simplest case a centroid formation of the individual measured values is used. In slightly more elaborate but slightly more accurate methods a theoretically derived function is fitted into the measurement profile of a mass peak, from which the optimal position of the location, frequency or time value are derived.

In the following, the location, frequency, or time coordinates are only referred to as the "position coordinates", or simply to the "position" of a mass peak in the mass spectrum.

This determination of the position of the signal profile of an ion in this spectrum, however, constitutes the main source of inaccuracies of mass determination. Since this determination of the position is used both in calibration and in the measurement of the unknown substance, the error increases in proportion.

An attempt to increase the accuracy of mass determination is therefore frequently undertaken by scanning a very large number of mass peaks along the spectrum during calibration and evaluating them, and then through their position coordinates, adapting a smooth curve, levelling out some inaccuracies. Since the same method for the measurement of the unknown mass cannot be used because the substance shows only a single peak, the gain in accuracy is limited. For more complex ions (heavy organic ions, for instance) the peak of an ion is always accompanied by several peaks of the same elemental but different isotopic composition. This is called here an "isotope group" of ion peaks.

In this case one can determine the mass of all these ions individually and therefrom calculate an improved mean for one peak of the pattern. If the atomic composition of the ion is known, one can very accurately calculate the correct mass distances between the ion peaks necessary for this averaging procedure. However, the accuracies of mass determination achieved so far are not yet satisfactory.

Improved accuracy of mass calculation is particularly important for the reliable identification of proteins. Here a protein usually is digested by an enzyme (trypsin for example), whereby the protein is always cut adjacent to amino acids specific to the enzyme. In this way digestion products are obtained which are about 10 to 20 amino acids long on a statistical average, but the length of which is naturally considerably dispersed and ranges from 1 to about 40 amino acids. Thus they cover a mass range of 100 to 5,000 atomic mass units. For this mass range an improved accuracy of mass determination is urgently being sought to be able to use the results of improved mass determination to identify the protein by referring to protein data banks more accurately. In this mass range good mass spectrometers can still resolve the ion peaks of an isotope group which therefore are separated fairly well (such a resolution is normally referred to as "unit mass resolution").

Nevertheless, an improvement is also being sought for the subsequent range of approximately 5,000 to 10,000 atomic mass units. Good time-of-flight mass spectrometers, for instance, can also provide unit mass resolution in that range.

For ions in this mass range of 5,000 to 10,000 atomic mass units there is a further difficulty for mass calibration: the mass peak of the so-called "monoisotopic" ions which is comprised of atoms of each of the most frequent isotopes, can no longer be easily identified and usually it is no longer visible in this spectrum. For instance, in the case of bovine insulin (the mass of the monoisotopic peak is 5731.616 atomic mass units) one frequently does not see the protonated, monoisotopic molecule peak of the compound $^{12}C_{254}{}^{1}H_{379}{}^{14}N_{65}{}^{16}O_{75}{}^{32}S_{6}$, at least not unless the spectrum is excellent and has a very good signal-to-noise ratio. Of the many hundred peaks of the abundance distribution of the isotopic pattern, which up to $^{13}C_{254}{}^{2}H_{379}{}^{15}N_{65}{}^{18}O_{75}{}^{36}S_{6}$ covers a total of 872 mass units, one sees only about 10 peaks from the distribution maximum.

Therefore, even with known substances it is not at all easy to actually allocate the individual peaks to the correct isotope compounds and therefore to the true masses. Calibration errors can easily occur in this way. Determination of the monoisotopic mass for unknown ions is even more difficult.

OBJECTIVE OF THE INVENTION

It is the objective of the invention to find a method for a precise determination of the position of ion mass signals which is superior to the methods of centroid determination or curve fitting of individual mass signals and which can be used as a basis for precise calibration and measurement processes. It is a secondary objective of the invention to achieve automatic recognition of the position of the monoisotopic peak for heavy ions.

BRIEF DESCRIPTION OF THE INVENTION

It is the basic idea of the invention to simultaneously fit a whole family of bell-shaped curves of known mass distances, known abundances and known width ratios into a measured signal pattern of several ion peaks, instead to fit just one single bell-shaped function curve into a measured signal profile of a single ion peak, as done previously. For the method according to this invention it is necessary to know the true mass distances (and therefore the positional distances) of the individual ion peaks, at least with a good level of approximation, to be able to specify fixed positional distances of the bell-shaped curves from one another. The widths of the bell-shaped curves must also be known in advance—in most cases the widths can be regarded as virtually identical. However, it is not always necessary to know precisely the true heights of the bell-shaped curves because, at least in the lower mass range, they may be taken from the measurements.

The function which has to be fitted may be comprised of several bell-shaped curves which, in the simplest case, all having the same width, the distances of which represent the true mass distances and the heights of which, again in the simplest case, represent the measured peak heights. The fitting process consists, again in the simplest case, in the minimization of the sum of the squared deviations between the curve function (composed by addition of bell-shaped curves) and the measured ion current profile, whereby only the position coordinate (location, frequency or time coordinate of the mathematical function) and a width factor are varied for the bell-shaped curves (in the case of bell-shaped curves with an identical width it is the width itself).

If the measured peaks are symmetric, a Gaussian distribution function can very simply be used as the bell-shaped curve, for instance. Optimization can be restricted to profile values above a threshold in order not to incorporate the background noise between the peaks in the fitting process. For assymmetric peaks, different profile functions are known to the specialist in the field.

The optimally fitted family of bell-shaped curves produces the position coordinate for a selected peak from the group with a high level of precision (and therefore also the position coordinates of all other peaks in the group). The precision is much higher than that of the conventional methods, even if the latter relate to a mean value of individual position determinations of several ion peaks. The reason for the improvement is that the physically predetermined mass distances and the also physically predetermined width ratios are inserted beforehand in the function which has to be fitted to the measured peak group. Under the otherwise customary optimization of individual ion peaks these distances, which are actually known in advance, are obtained as unnecessary secondary results fraught with uncertainties, and the same applies to the widths of the ion peaks.

From the width of the optimally fitted bell-shaped curves, mass resolution is a spin-off of the method according to the invention. Another spin-off is the fact that the quality of adaptation can be used to obtained a quality factor which automatically reflects the precision of the position coordinate, and hence the quality of mass determination in this individual case.

In the case of an isotopic group one can determine the true mass distances between the peaks and their abundance distribution from calculated isotopic pattern. However, the compositions of the substances from the elements must be known beforehand, and with unknown substances this is not the case. Nevertheless, frequently one can assign the substance to a chemical class of substances with approximately constant percentages of elements. If one knows the approximate mass of the ions, it is then possible to calculate an isotopic pattern, the mass distances of which correspond to the true distances with an exceptionally good approximation. Fluctuations in the composition do practically not affect the mass distances. The calculated abundance distribution is slightly more affected by fluctuations in element composition but this is of no major importance in determining the position of a peak in accordance with the invention.

For approximate calculation of the isotopic pattern, one can make assumptions about the proportions of carbon, hydrogen, oxygen, nitrogen and other elements for the substances of a chemical class, for example by calculating average percentage contents. For instance, one can regard as a chemical class the proteins whose composition of amino acids indicates an at least roughly identical statistical composition of carbon, hydrogen, nitrogen and oxygen. These approximate values of the composition are certainly sufficient for this method and produce amazingly good results for mass determination.

Other chemical classes for these purposes are, for example, DNA (polymers of the four desoxyribonucleic acids of all genetic material), which carry an additional phosphor component; or glycoproteins whose carbon and oxygen contents are higher than those of pure proteins. For polymerized plastics one can also generate such statistically determined compositions.

Calculation of the isotopic pattern is certainly complicated but, for example, it can be obtained in a well-known manner using Fourier transformation. These calculations may be performed once for a chemical class as a function of mass at certain distances, saved in tables and used again and again in future.

In using calculated isotopic abundance distributions there comes into play quite automatically another highly valuable advantage: the position of the monoisotopic peak is recognized and its mass is calculated. That is the case even if that peak is not visible at all in the measured isotopic pattern. The reliability of finding the monoisotopic peak is very high.

A surprisingly large simplification of this method with nevertheless very good results can be obtained by not using all the involved elements for the calculation of the ion frequencies of the isotopic group and for the calculation of the distances, but only the carbon isotopes, because the pattern of the isotopic group is chiefly determined by the carbon and its isotopes. However, this only applies inasmuch as the molecules do not contain any double-isotopic elements such as chlorine, bromine or silver with approximately the same abundances of both isotopes. For organic substances which only contain carbon, hydrogen, nitrogen, oxygen and phosphor, and even small quantities of sulfur, in the mass range from 1,000 to 5,000 atomic mass units a position determination of the monoisotopic peak can be performed surprisingly well only considering the carbon in the isotopic pattern of the isotopic group.

Abundance $I_n$ of the n-th carbon isotope (n=0, 1, 2 . . . ) in the isotopic pattern can be very simply calculated with a simple formula into which only the number $N_C$ of the carbon atoms and the abundance $H_{13}$ (0.0111) of the carbon isotope $^{13}C$ is inserted:

$$I_n = \frac{N_C!}{n! \times (N_C - n)!} \times H_{13}^n$$

whereby the number $N_C$ of carbon atoms can be calculated, for example, from the average number of carbon atoms $A_c$ per amino acid, mass m and average mass $m_A$ of aminoacids:

$$N_C = \text{int}\left(\frac{m}{m_A} \times A_C\right),$$

here $m_A$=117.5 atomic mass units and $A_C$=5.25.

The distance between the peaks can in further simplification always assumed to be 1.003355 atomic mass units (the distance between carbon isotopes). The curve to be fitted is therefore relatively simple and easy to calculate—as the only fitting variables, the position parameter and the width of the Gaussian curves are varied until the sum of quadratic deviations is at a minimum. This method leads, at least in the extremely interesting range of 1,000 to 5,000 atomic mass units, to surprisingly good results because here the influences of non carbon elements on the abundance distribution and on the accuracy of position determination are extremely low.

For this reason no improvement in the precise position calculation can be expected if one also varies the average carbon content in peak adaptation. However, particularly in the higher mass range it can be expected that with a grossly incorrect abundance distribution the bell-shaped curves may be fitted incorrectly, the difference being a whole mass number. On the other hand, only an improvement in the calculation of abundance distribution can help.

A simple method of calculating a much "more correct" abundance distribution consists in performing the abundance calculation in the same way as previously only with carbon, but taking into account the mean composition of the elements by introducing a slight, hypothetical increase in abundance $H_{13}$ of the $^{13}C$ isotope. The normal abundance of this isotope 13 is 1.108% of the abundance of the $^{12}C$ isotope; a slight increase (to values between 1.2% and 1.4%) leads to a desirable widening of the abundance distribution. The percentage carbon content must practically not be changed; only the increase in the $^{13}C$ content causes the desired change in distribution in adapting to the presence of the other elements. However, in a similar manner one can also perform an extremely weak, hypothetical correction (reduction) in mass distance which is 1.003355 atomic mass units for carbon. The calculations of the correction (or the simpler experimental determination of such corrections) only need to be performed once for the substances of a chemical class. However, only in the higher mass range do they produce an improvement on the very simple method of only using carbon with unfalsified data.

A still better calculation of the abundance distribution is obtained, if the substance is assumed to contain only carbon atoms, and the carbon number is simply calculated as $N_c$=m/12. Small corrections by a slight decrease of this number $N_c$ (or a slight decrease of the abundance $H_{13}$) can even improve the result.

For integrating the bell-shaped curves it is possible not only to search for the smallest sum of deviation squares but also to use correlation calculations (maximizing correlation), and integration using Fourier transformations is possible. The method using the smallest sum of the squared deviations, however, has proven to be the best so far.

Another application of the method according to the invention consists in the peak group not being an isotope group but various polymers of a substance (e.g. monomers, dimers, trimers of the matrix substance in MALDI time-of-flight mass spectrometry). Also a fragmentation pattern can be used. In both cases the additional inclusion of isotopic patterns is again possible.

Another application consists in using the groups of multiply charged molecule ions, as are formed in electrospray ionization for instance. Here, though, it is not the mass distances but always the integral ratios of the masses to their charges which are previously known (apart from the additional link of a proton per charge). Here too the isotopic patterns can be included. As a spin-off here the molecular weight of the neutral molecule is obtained.

PARTICULARLY PREFERRED EMBODIMENTS

A particularly interesting application of the method according to the invention is the acquisition of mass spectra of large organic molecules in time-of-flight mass spectrometers. In the mass range from 1,000 to 10,000 atomic mass units isotopic groups with a large number of 3 to 15 isotopic peaks occur above a threshold of about 5% of the most frequent ion. These ion peaks can very efficiently be used for this method.

In the simplest case one can perform the optimizing fit under the following conditions:

(a) the mathematically generated function consists of an additive superimposition of Gaussian curves with identical widths;

(b) the abundance distribution of the isotopic peaks is only calculated with the two carbon isotopes and with a carbon content established as percentage for the chemical class;

(c) for the mass distances the fixed value of 1.003355 atomic mass units (distance between the carbon isotopes) is used;

(d) only the time-of-flight coordinate and the width of the Gaussian curves are varied for optimization.

Figure 1:
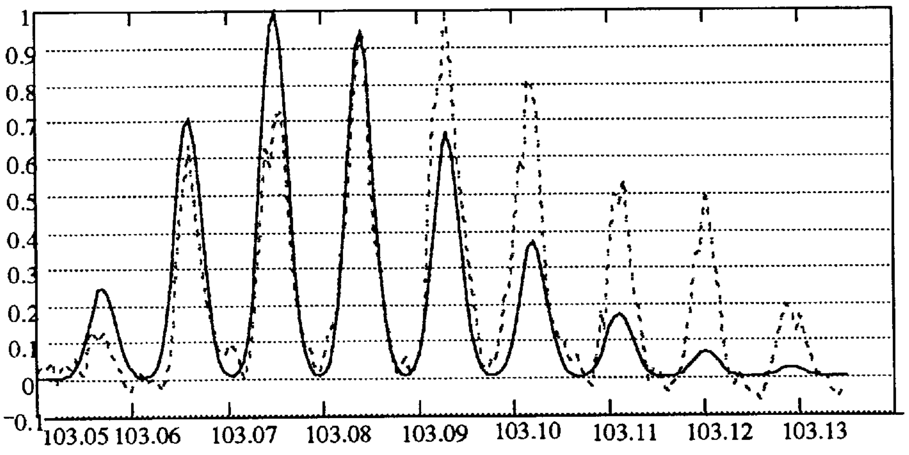
FIG. 1 shows results of a position determination of the molecule ions of bovine insulin in a time-of-flight spectrum. A considerably simplified method was used which only applies the abundances of the carbon atoms (relative abundance of $C^{13}$=1.1122%) and the mass distances are equal to the distance between the carbon isotopes. Here (correctly) 5.25 carbon atoms per amino acid have been assumed so the abundance distribution is too narrow due to the non consideration of the other elements. The calculated time of flight for the monoisotopic peak here is 103056.855 nanoseconds.
Figure 2:
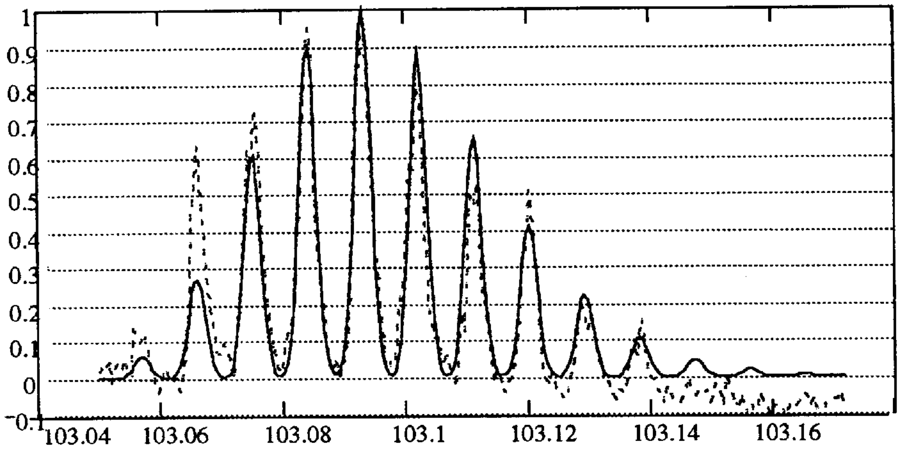
FIG. 2 shows the results of a similar position determination but assuming only 8.25 carbon atoms per amino acid in order to achieve a broader distribution. The time of flight of the monoisotopic peak here was calculated as 103056.798 nanoseconds and is accurate to better than 0.05 nanoseconds, although for the measurements a transient recorder with only 4 gigahertz was used.
Figure 3:
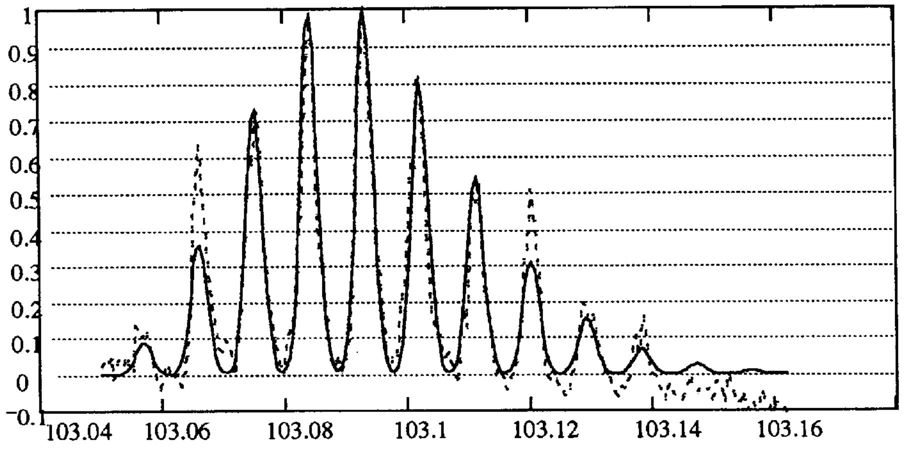
In FIG. 3 a hypothetical abundance of carbon isotope 13 was assumed to be 1.6% in order to take account of the contents accounted for by nitrogen, oxygen and sulfur. The calculated distribution quantitatively matches the measured one much better (similar to FIG. 2) although the correct carbon content of 5.25 carbon atoms per amino acid was assumed. The time of flight of the monoisotopic ions was calculated as 103056.807 nanoseconds and agrees very well with the time of flight in FIG. 2.

Despite this extreme simplification of the basic idea of the invention, excellent results can already be obtained, particularly in the most interesting mass range of 1,000 to 5,000 atomic mass units, but certainly also above that. The estimation of the carbon content does not even have to be very good. FIGS. 1 and 2 show results for bovine insulin, which have been obtained on the basis of very different assumptions on carbon content. In FIG. 1 only 5.25 carbon atoms per amino acid were assumed, while in FIG. 2 it was 8.25 carbon atoms. Determination of time of flight only differs by 0.057 nanoseconds for these two cases (0.6 ppm of time of flight). In both cases the position of the monoisotopic peak was found correctly although the position coordinate was varied over five atomic mass units and therefore encouraged false allocations.

The accuracy of mass determination using this extremely simple method is, generally speaking, better than 1 ppm (part per million) of the mass to be determined, for fairly noise-free spectra. Furthermore, this method reflects the mass of the monoisotopic peak with virtually no error.

The results can be still improved by including in the abundance calculation the isotopic conditions taking all the elements involved and their mean frequencies into account. However, the calculation is then particularly complicated because the resolution is then reflected in the widths and heights of the individual mass peaks and not all the mass peaks have the same width. Nevertheless, for a chemical class the calculations only have to be performed for one series of gradually increasing masses. The abundance tables are stored and used later for fitting.

A simpler method is to take the other elements into account by hypothetically increasing the abundance of the $^{13}C$ isotope and slightly reducing the distances between the mass peaks. The abundance distributions become wider and approximate better to the measured abundance distribution. Although the hypothetical changes can be calculated, it is much simpler to determine them experimentally by trial and error.

The method of searching for the smallest sum of the squared deviations is regarded as well-known here. Near the minimum of the sum there is a parabolic dependence on the position coordinate. The narrowness or width of the parabola describes how precisely the position coordinate can be determined. A very narrow parabola produces a high level of precision, while a very wide parabola produces low precision. The narrowness of the parabola at its minimum can very easily be determined via the second derivation of the sum according to the position coordinate (or with actually calculated sums) via the second differential quotient. This second derivation describes the curvature of the parabola at its minimum. The second differential quotient therefore constitutes a quality parameter which reflects the individual precision of position determination and therefore the mass determination obtained later from position determination. The quality parameter is inversely proportional to the error interval for the determination of the position coordinate. From this quality parameter, for example, an accuracy interval can be calculated in which the correct mass can be found with a specified level of probability.

The method of mass determination based on this invention therefore makes it possible to intelligently reduce even complex mass spectra to create simple substance peak lists whereby in the lists (1) there are only monoisotopic peaks (considerably simplified spectrum), (2) very accurate masses can be stated for these monoisotopic peaks, (3) integrated intensities can be stated from the isotopic groups, and (4) each entry is given an individual quality parameter for the accuracy of mass determination.

However, it does not need to be the isotopic patterns which serve as a basis for this method. Known fragmentation patterns or known distributions of polymers may be used just as well. If the masses of the individual ions are far apart, the peak widths can no longer be assumed to be identical. However, the ratios of the peak widths are known from the theoretical fundamentals of the mass spectrometric method involved.

One special case is where series of multiply charged ions of various charge states which are generated by the electrospray ionization method. Here it is not the mass distances but the mass ratios which are constant, and even these are not accurate because for each additional charge another proton is added to the mass. Nevertheless, any expert in this field will manage to use the basic idea of the invention to develop the correct fitting method for this case as well. The bell-shaped curves must be created from the series with the mass-to-charge ratios $(m+n)^{n+}$, whereby m is the mass of the molecules and n is the number of additional protons. For the width of the ion peaks the theoretical fundamentals for the mass spectrometer concerned must again be applied, but also including empirical values. For the intensity distributions the measured values can be taken.

Both the series of fragment ions, polymer ions or charge state ions can each be combined with isotopic abundance patterns.

If the basic idea of this invention is understood, any expert in this field will be able to find and conduct the best method for determining precise masses for any analytical task.

Methods according to the basic idea of this invention can also be easily integrated into software analysis programs for mass spectra. In this case the user ultimately only needs to state the chemical class of the examined substances and the type of peak groups in order to arrive at fully automatic evaluation of the spectra up to reduced peak lists.

What is claimed is:

1. Method to determine the precise position of an ion peak within a mass spectrum as a basis for precise mass determination of the ions of that ion peak, whereby the ion peak belongs to a peak group the mass distances and width ratios of which are known, wherein a function which consists of additively superimposed bell-shaped curves, the distances between which conform to the known true mass distances and their width ratios conform to the true width ratios, is fitted to the measured ion current profile of the peak group by a mathematical optimization method.

2. Method according to claim 1, wherein the mathematical optimization method used is the method of minimizing the sum of the squares of all the deviations between curve function values and measured ion current values.

3. Method according to claim 2, wherein in creating the deviation squares only ion current measurements are used above a freely selected threshold value.

4. Method according to claim 1, wherein the bell-shaped curves are Gaussian distribution curves.

5. Method according to claim 1, wherein (1) the heights of the bell-shaped curves conform to the measured peak heights, (2) the widths are assumed to be identical for all the bell-shaped curves, and (3) for the fitting process only the position coordinate in the spectrum, i.e. the location, frequency or time coordinate depending on the type of scanning, and the width of the bell-shaped curve are varied.

6. Method according to claim 1, wherein (1) an isotopic group of ion peaks is used as the peak group, (2) the heights of the bell-shaped curves correspond to the isotopic peak abundance distribution calculated from an estimated element composition, (3) the width ratios of the bell-shaped curves correspond to the calculated line width ratios in the isotopic group, and (4) for the fitting process only the position coordinate in the spectrum and a common factor for the width of the bell-shaped curves are varied.

7. Method according to claim 6, wherein the widths of the bell-shaped curves are assumed to be approximately identical.

8. Method according to claim 6, wherein for calculating the abundance distribution only the isotopes of the carbon and an estimated percentage of carbon in this substance is used.

9. Method according to claim 8, wherein for the distances of the mass peaks of the ions of an isotopic group a fixed distance is used.

10. Method according to claim 9, wherein for the distances of the mass peaks of the ions of an isotopic group the distance of 1.003355 atomic units of the carbon isotopes is used.

11. Method according to claim 6, wherein for the estimation of the composition of the elements the average composition of the substances of a chemical class is taken to which the measured substance belongs.

12. Method according to claim 8, wherein the non-carbon elements of a chemical class are taken into account in the calculation of abundance distribution for that class by (a) assuming that the abundance of the carbon isotope 13 is slightly different from the correct ratio, (b) assuming that the distances are slightly less than that of the carbon isotopes, and (c) calculating the abundance distribution only from the two carbon isotopes with the corrected values for abundance and distance of the isotopes.

13. Method according to claim 1, wherein a quality parameter is determined for the precision of the position which is proportional or inversely proportional to the second differential quotient of the sum of the squared deviations after the position coordinate.

14. Method according to claim 1, wherein the peak group used is the group of fragment ions, polymer ions or charge state ions.

* * * * *